United States Patent Office 3,142,607
Patented July 28, 1964

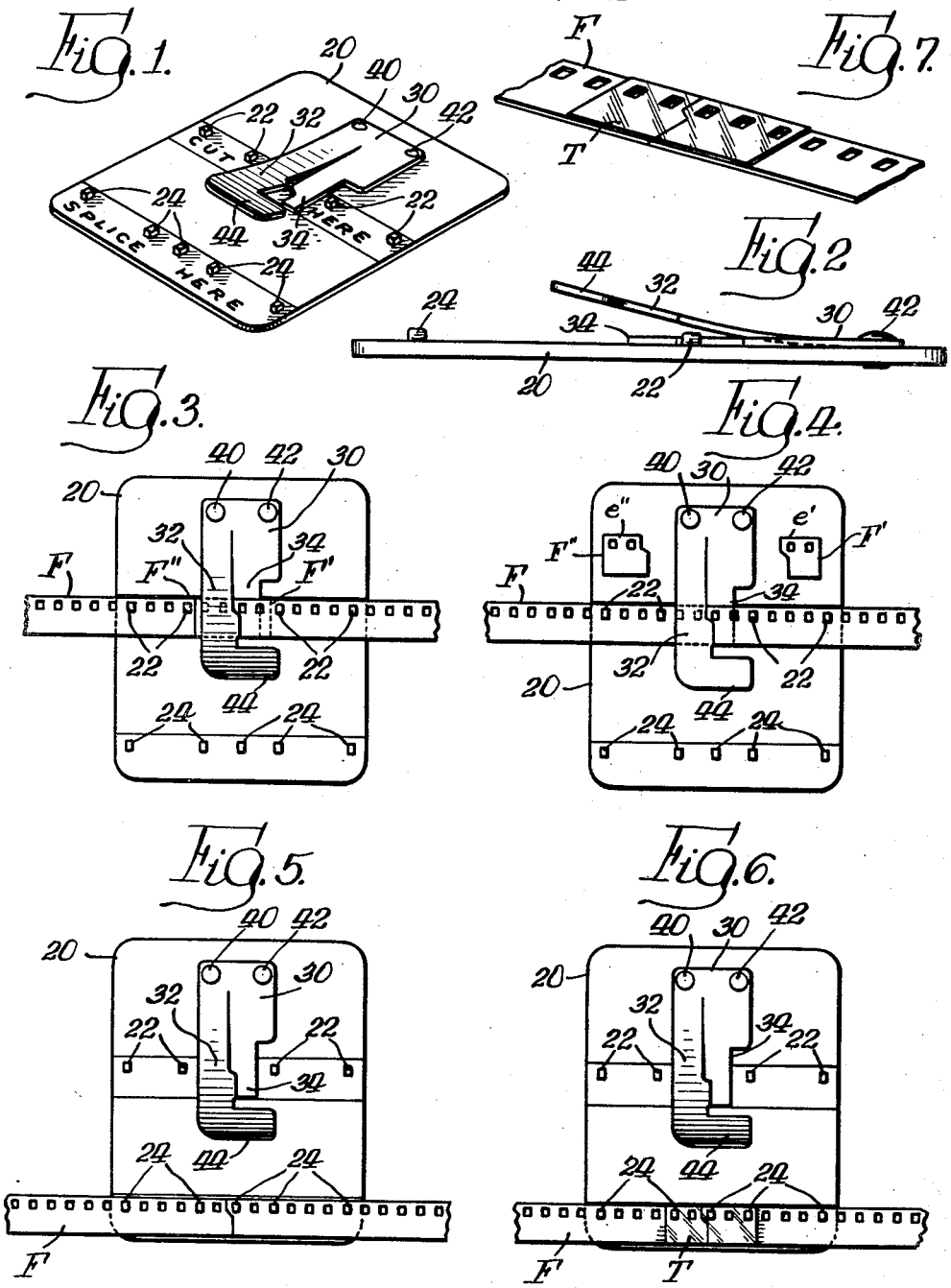

3,142,607
FILM SPLICER
Harold S. Scherer, Lincolnwood, Ill., assignor to Scherer Mfg. Co., Inc., Skokie, Ill., a corporation of Illinois
Filed Dec. 18, 1961, Ser. No. 160,164
3 Claims. (Cl. 156—506)

The present invention relates to film splicers of the type comprising means for trimming the ends of a length of film in relation to sprocket holes therein and mounting the same with the cut ends of the film butted against one another to permit application of tape for splicing the ends together.

While various types of film splicers heretofore proposed embody mounting means for holding a strip of film, and a cutter member for trimming the same, many of which function satisfactorily to provide the desired result, such known devices are relatively expensive and relatively complex to manufacture.

Prior art film splicers generally include a base portion, which may comprise a box-like member having side walls and a top mounting plate on which pins or teeth are provided to cooperate with sprocket holes in a strip of film, and further include a cutter member which is generally pivotally mounted on the base by means of a hinge pin. With devices of this type, it is common to mount a length of film on sprocket teeth provided on the base plate, operate the cutter member to trim the film, and then to apply splicing tape to secure the desired splice. The hinged cutter member is normally pivotable away from the base plate to provide clearance for application of the tape.

The principal object of the present invention is to provide a film splicer which has all of the utility of previously proposed devices, and which can be manufactured by simplified manufacturing methods at a substantial reduction in time and expense.

In furtherance of the foregoing object, I provide a film splicer having a base portion comprising a flat metal plate with a plurality of integral sprocket teeth formed on its top surface, and having a cutting member formed from a thin flat sheet of metal and anchored to the base plate by a pair of rivets or the like. The cutter member is sheared longitudinally along a portion of its length, and one side thereof is bent somewhat away from the base plate so that in its normal position clearance is provided therebetween for insertion of a strip of film to be trimmed. Trimming of film is effected by urging the bent cutter portion downwardly against the base plate whereby it cooperates with the fixed portion of the cutter member to shear a length of film positioned therebetween. Upon release of the movable portion of the cutter, it will spring back to the position to which it was originally bent.

The foregoing structure eliminates the need for a more complex and expensive hinged cutter member, and provides an improved and vastly simplified film splicing device. Inasmuch as my cutter member is not freely pivotable to the same extent as a hinged cutter, it is preferable to provide two series of sprocket teeth or lugs on the base plate, one set of teeth adjacent the cutter member for mounting a strip of film to be trimmed, and a second set of teeth displaced from the cutter member for holding the trimmed ends of a film strip in abutting relation for application of tape to effect a splice.

Other advantages and uses of my invention will be apparent, or become so, as I describe my invention in greater detail in conjunction with the accompanying drawings in which:

FIGURE 1 is a perspective view of a simplified film splicer embodying the invention;

FIGURE 2 is an enlarged side elevational view of the film splicer of FIGURE 1;

FIGURE 3 is a top plan view of the splicer showing a strip of film mounted thereon with the ends overlapped in position to be trimmed;

FIGURE 4 is a view similar to FIGURE 3 showing the strip of film after it has been cut, and showing the end portions which are trimmed off;

FIGURE 5 is a top plan view of my splicer showing a strip of previously trimmed film mounted on a second set of sprocket teeth displaced from the cutter member, the film being mounted with its trimmed ends in abutting relation for application of tape thereto to effect a splice;

FIGURE 6 is a view similar to FIGURE 5 showing a length of splicing tape applied to the film; and FIGURE 7 is an enlarged perspective view of a fragmentary portion of a film strip illustrating a spliced joint effected by trimming the ends of the film and applying a short length of splicing tape thereto.

Referring now to FIGURES 1 and 2, there is shown a base member 20 comprising a generally flat metal plate having two sets of sprocket teeth or lugs 22 and 24 formed integral therewith so as to project upwardly and serve as means on which a strip of film may be mounted.

The sprocket teeth 22 and 24 may be extruded from the base plate by pressing indentations into the bottom side thereof and forming the teeth from the metal thus displaced. The sprocket teeth are spaced apart in relation to the spacing of sprocket holes in standard film strips so that the film may be mounted on the teeth 22 and cut in relation to the position of such holes, and may thereafter be mounted on the series of teeth 24 to cause the trimmed ends of the film to abut.

By way of example, in the embodiment shown the four teeth 22 are arranged so that the two innermost teeth are spaced apart five times the distance between adjacent sprocket holes on a strip of film, and the left and right outer most teeth are spaced from their nearest innermost teeth or lugs an amount equal to three and four times said distance, respectively. With respect to the series of teeth 24, the three innermost teeth are spaced apart two times the distance between adjacent sprocket holes on a strip of film, and the two outermost teeth are spaced from the nearest corresponding innermost tooth or lug an amount equal to four times said distance.

A cutting member is formed from a relatively thin stainless steel sheet 30 which is sheared or cut longitudinally along a portion of its length to provide a movable portion 32 and a stationary portion 34. The rear end of the steel sheet 30 is rigidly secured to the base plate 20 by a pair of rivets 40 and 42, and the movable cutter portion 32 is bent somewhat away from the base plate to provide clearance for mounting of a strip of film on the series of teeth 22 so as to lie between the movable cutter portion 32 and the stationary cutter portion 34.

FIGURE 3 shows a strip of film F mounted in position to be trimmed, its ends F' and F" being overlapped sufficiently so that each end extends beneath the cutter. It will be seen that the cutter is sheared along an offset line so that the ends of a strip of trimmed film will be offset in a complementary manner, thus providing a more rigid joint when splicing tape is applied thereto.

Cutting or trimming of the tap F is effected by depressing a handle portion 44 on the movable cutter portion 32 downwardly against the base plate 20, thus shearing off ends of the film such as shown at e' and e" in FIGURE 4, after which release of the cutter will permit the movable portion to return to its normal position. The cutter is positioned so that it shears the film midway between the two innermost teeth 22, whereby each of the ends e' and e" is cut at a point approximately midway between two adjacent sprocket holes. In this manner, adjacent sprocket holes near the butted joint of a spliced film will be properly spaced.

The trimmed film is removed from the series of teeth 22 and mounted on the second series of teeth 24 with its offset end portions in abutting relation as shown in FIGURE 5. A short length of splicing tape T is then pressed firmly over the butted ends of the film in the usual manner to effect a spliced joint. If desired, the film may then be turned over and a second length of splicing tape applied to the opposite side of the film. A spliced joint as effected by application of a single strip of transparent tape is shown in FIGURE 7.

It will be seen that I have accomplished the foregoing object of providing an unusually simplified and inexpensive film splicer which has all of the utility of the more expensive devices heretofore used. The film splicer described herein comprises two parts, each made from a flat plate or sheet of metal, and secured to one another with two rivets.

It will be understood that various modifications and re-arrangements may be made in the embodiment selected for disclosing my invention without departing from the spirit and scope thereof.

I claim:
1. A film splicer comprising, in combination, a substantially flat base plate member, a cutter member comprising a thin flexible metal plate cut longitudinally along a portion of its length to provide a movable cutter portion and a stationary cutter portion which are joined together at the rear end of said cutter member, said cutter member being secured at its rear end to said base plate with said stationary cutter portion disposed so as to lie substantially flat on said base plate and with said movable cutter portion being bent upwardly away from said base plate an amount sufficient to permit insertion of film therebetween, and a plurality of sprocket teeth projecting upwardly from said base member, said teeth being arranged in a row which extends transversely of said cutter members and beneath said movable cutter portion whereby a strip of film to be spliced may be mounted on said sprocket teeth so as to extend transversely over said stationary cutter portion and under said movable cutter portion and may be cut by manually depressing the free end of said movable cutter portion and thereby temporarily bending the latter downwardly against said base plate.

2. A film splicer comprising, in combination, a substantially flat relatively rigid metal base plate member, a cutter member comprising a thin flexible metal plate having an offset cut extending longitudinally along a portion of its length to provide a movable cutter portion and a stationary cutter portion which are joined together at the rear end of said cutter member, said cutter member being riveted at its rear end to said base plate with said stationary cutter portion disposed so as to lie substantially flat on said base plate and with said movable cutter portion being bent upwardly away from said base plate an amount sufficient to permit insertion of film therebetween, and a plurality of sprocket teeth formed integral with said base plate so as to project upwardly therefrom, said teeth being arranged in a row which extends transversely of said cutter members and beneath said movable cutter portion whereby a strip of film to be spliced may be mounted on said sprocket teeth so as to extend transversely over said stationary cutter portion and under said movable cutter portion and may be cut by manually depressing the free end of said movable cutter portion and thereby temporarily bending the latter downwardly against said base plate.

3. A film splicer as set forth in claim 1 wherein a second row of sprocket teeth are formed integral with said base plate so as to project upwardly therefrom, said second row of teeth being parallel to the first-mentioned row and being spaced from said cutter member whereby a strip of film to be spliced may be mounted on said second row of teeth.

References Cited in the file of this patent
UNITED STATES PATENTS

| | | |
|---|---|---|
| 914,613 | Storlie | Mar. 9, 1909 |
| 2,367,330 | Bolsey | Jan. 16, 1945 |
| 2,923,195 | Reibel | Feb. 2, 1960 |